Aug. 7, 1923.
E. KRAFT
DIPPING APPARATUS
Filed May 11, 1921
1,463,960
3 Sheets-Sheet 1
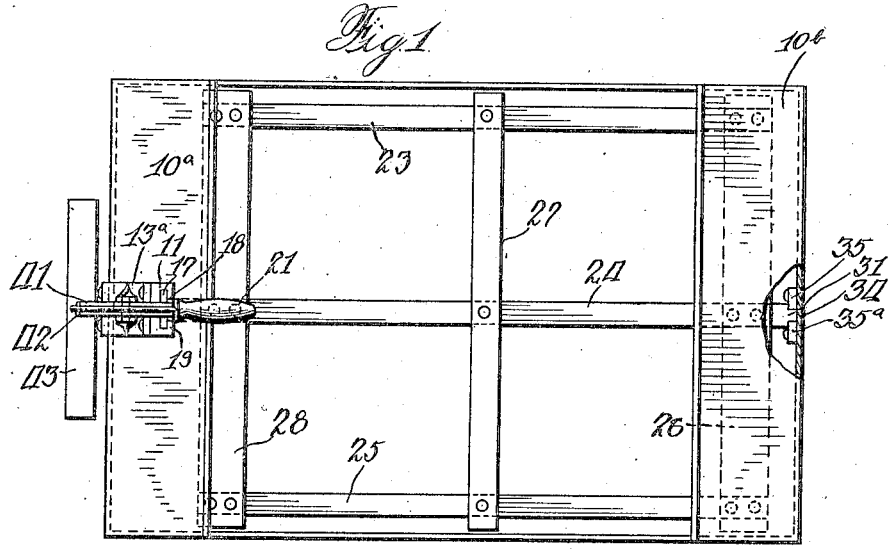
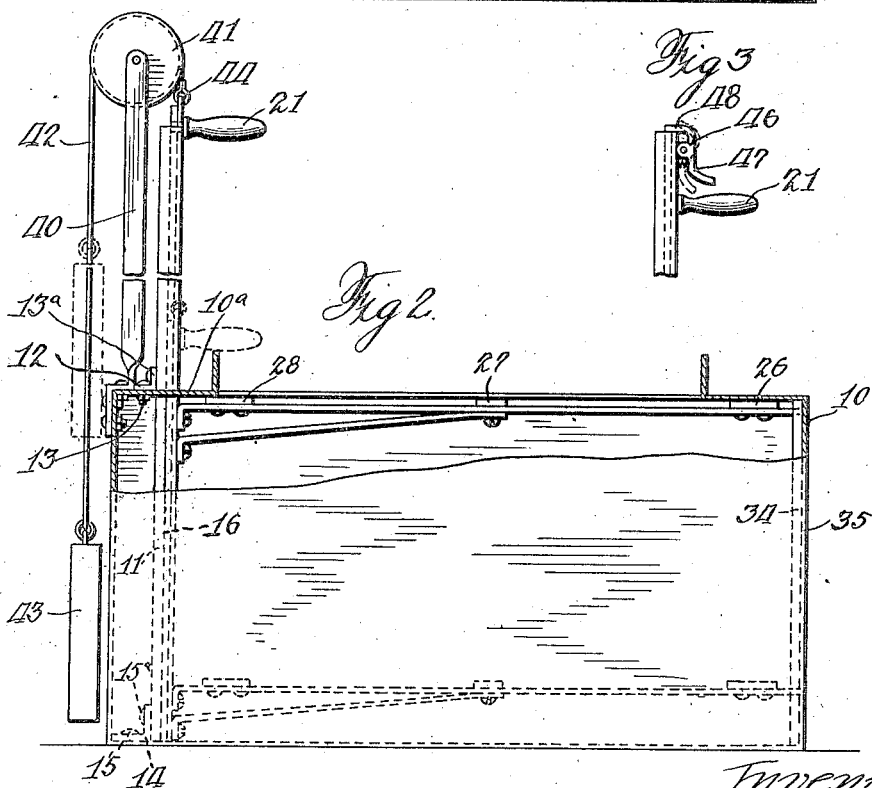

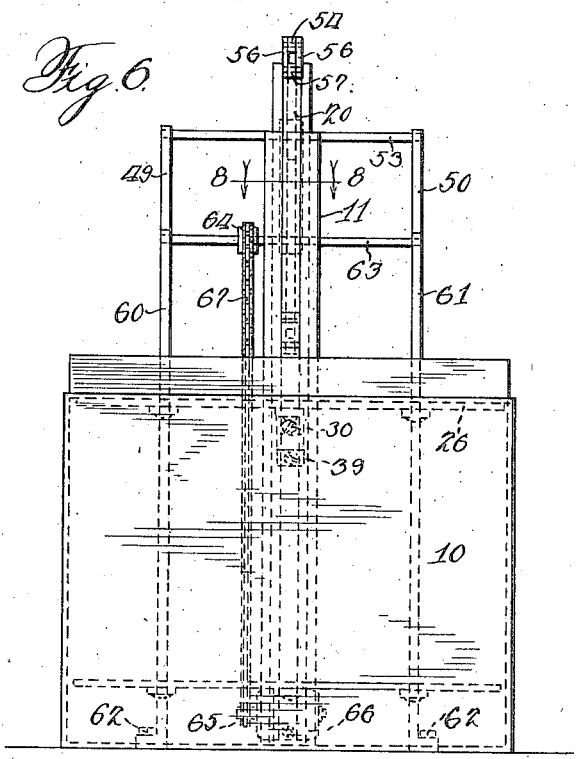

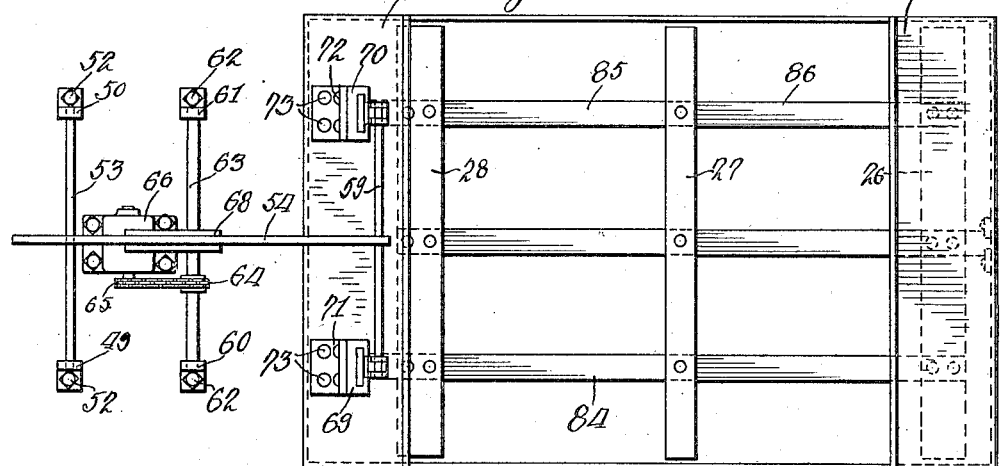

Patented Aug. 7, 1923.

1,463,960

UNITED STATES PATENT OFFICE.

EDWARD KRAFT, OF CHICAGO, ILLINOIS.

DIPPING APPARATUS.

Application filed May 11, 1921. Serial No. 468,571.

*To all whom it may concern:*

Be it known that I, EDWARD KRAFT, a citizen of the United States, residing at Chicago, in the county of Cook and State of Illinois, have invented certain new and useful Improvements in Dipping Apparatus, of which the following is a specification.

My invention relates to a dipping apparatus and has for its particular object the provision of an apparatus which is adapted to support an article which is dipped into a tank containing a liquid solution without in any way bringing the solution into contact with the hands of the operator, and also providing means whereby the article can be held on a support above the surface of the solution so that all particles of the solution which do not adhere to the surface of the article being dipped can drain back into the tank where the solution is retained, and thus the article which is dipped is allowed to drain so that the dipping solution will not drop off on to the floor or on another article after being removed from the tank.

Another object of my invention is the provision of a dipping apparatus which can be either manually operated or which can be operated by power if it is so desired, and which is simple in operation and efficient in results.

Another and further object of my invention is the provision of means whereby articles may be suspended from a support above the surface of the solution and dipped into a tank containing the solution instead of being supported upon a dipping rack.

Another and further object of my invention is to provide a dipping apparatus which is collapsible and may be taken apart and cleaned, and also knocked down for purposes of shipment.

Another and further object of my invention is to provide a liquid dipping apparatus which may be operated smoothly, steadily and without play or lost motion.

These and other objects of my invention will be more fully and better understood by reference to the accompanying sheets of drawings, and in which—

Figure 1 is a plan view of a tank having my improved dipping apparatus secured thereto;

Figure 2 is a view in elevation of my improved apparatus;

Figure 3 is a vertical side elevation of the upper end of the support member showing a latch secured thereto;

Figure 4 is a perspective view showing the support mechanism and slide secured thereto;

Figure 5 is a plan view of a power operated dipping mechanism embodying my invention;

Figure 6 is a side view in elevation of a slightly modified form of the apparatus shown in Figure 5, a single vertical support member being shown instead of two, as illustrated in Figure 5;

Figure 7 is a plan view of the apparatus shown in Figure 6; and

Figure 8 is a cross-sectional view of the support member on lines 8—8 of Figure 6.

Referring now specifically to the drawings and in which like reference characters refer to like parts throughout, a tank 10 is shown having a vertically extending member 11 secured to one of the end walls thereof in any approved manner, as by an angle 12, which is secured to a member $10^a$ which extends across the tank 10 by means of bolts 13, and having bolts $13^a$ which pass through the angle 12 and member 11. A second angle 14 is provided in the bottom of the tank 10 and secured thereto by means of a rivet or bolt 15 in any approved manner, another bolt $15^a$ passing through the angle 14 and the member 11 at its lower end so that the member 11 is held securely in a restricted position in the tank 10. The member 11 has a channel 16 extending longitudinally thereof and into which a member 17 is adapted to fit, and has a pair of members 18 and 19 secured thereto in any approved manner, the inner edges of which extend for a slight distance over the edges of the channel 16 in the member 11, and form retaining means for the member 17 which slides in the channel 16. The member 17 has a member 20 secured thereto by means of a bolt $20^a$, a handle 21 being secured to the member 20 in any approved manner. Fitted within the tank 10 is a rack 22 which is composed of a plurality of longitudinally extending members 23 and 25, and transversely extending members 26, 27 and 28 which are riveted to the members 23 and 25 so that a rack 22 is formed rectangular in shape which is adapted to support the articles to be dipped. The rack 22 is secured to a member 24 by means of bolts $24^a$ which pass through the members 26 and 28, and has an upturned portion through which a bolt 30 passes thus securing the member 24 to the member 20. A tongue 31 is formed on the end of the member 24 and shoulder portions 32 and 33 are formed, the tongue 31 fitting into a groove 34 formed between two vertically spaced upstanding guide members 35 and 35$^a$ which are secured to the end of the tank 10. A brace 36 is secured to the underside of the member 24 by means of a bolt 37 which extends through the member 24, also the member 27, the brace 36 having an upturned portion 38 at its inner end and is secured to the member 20 by means of a bolt 39, the brace 36 serving to stiffen the rack 22 and assist the member 24 is supporting the rack 22 when articles to be dipped are placed thereon. Secured to the tank is a vertically extending member 40 having a pulley 41 mounted thereon at its upper end and over which a cable 42 extends. The cable 42 has a counterweight 43 secured thereto at one of its ends and its opposite end being secured to the upper end of the member 20 by means of a link 44 which is inserted in an opening 45 in the member 20, the purpose of the counterweight being to counteract the weight of articles being placed upon the rack 22 when they are dipped into the solution. A latch 46, illustrated in detail in Figure 3, is provided having an outstanding portion 47 which is hinged to the member 20 and has a projection 48 thereon which is adapted to extend over and engage the upper end of the member 11, thus holding the rack 22 in a stationary position out of the solution contained in the tank 10, and allow the articles placed thereon to drain after they have been dipped in the solution. It will be understood that the member 11 extends through a hole in the cover 10$^a$, a further short cover 10$^b$ being provided which covers a part of the tank 10.

Referring now specifically to Figures 5 and 6 wherein a modified form of my invention is shown consisting of a power mechanism applied to the apparatus shown in Figures 1 and 2, and which consists of a pair of vertically extending members 49 and 50 which are turned outward at their lower ends and are secured to the floor 51 by means of bolts 52, and are connected at their upper ends by a horizontally extending shaft 53. A rocker arm 54 is provided having a slot 55 at its rear end and through which the rod 53 extends, thus connecting the rocker arm 54 to the members 49 and 50. The rocker arm 54 is connected at its forward end to the member 20 by means of a link 56 and a stud 57 which is connected to the member 20, a pin 58 connecting the stud 57 and the link 56, and a second pin 59 connects the link 56 and the rocker arm 54. The member 11 is split in its upper end, as shown in Figure 8, to allow the rocker arm 54 to pass downward between the portions of the member 11 during the dipping operation. Intermediate the end of the tank 10 and the members 49 and 50 are placed a second pair of vertically extending members 60 and 61 having their lower ends turned in a horizontal direction and are secured to the floor 51 by means of bolts 62, 62, and having a horizontally extending shaft 63 rotatively mounted therein at their upper ends to which is secured a sprocket wheel 64 in alignment with a second sprocket wheel 65 of a motor 66, a chain 67 connecting the two sprocket wheels 64 and 65. An eccentric member 68 is secured to the shaft 63, the said eccentric member 68 being positioned directly underneath the rocker arm 54, the rocker arm 54 being in frictional peripheral engagement with the said eccentric member 68. In this form of the device the weight of the rack 22 and the articles to be dipped in the tank keeps the rocker arm 54 in contact with the eccentric member 68 as it is rotated by the motor 66 and the rack 22 is raised and lowered into and out of the solution as required. Through any arrangement of the gears or shape of the eccentric the dipping operation may be turned as desired.

In Figure 7 is illustrated a modified form of the power operated device illustrated in Figures 5 and 6 and in which a pair of vertically extending guide members 69 and 70 are provided which extend through the member 10$^a$ and are secured thereto by means of angles 71 and 72, rivets 73 serving to connect the angles 71 and 72 to the cover 10$^a$, and bolts 74 serve to connect the members 69 and 70 to the angles. The members 69 and 70 have channels 75 and 76 therein within which members 77 and 78 are secured, and to which members 79 and 80 are secured. Links 81 and 82 are secured to the upper ends of the members 79 and 80 and have a connecting rod 83 secured thereto, to which the rocker arm 54 is secured in any suitable manner. Support members 84 and 85 are secured to the members 79 and 80 in any suitable manner and which form a part of a rack 86. A longitudinally extending member 87 is provided having a tongue portion 88 which extends between the guide members 35 and 35$^a$. Members 89, 90 and 91 extending transversely of the tank 10 and are secured to the members 84 and 85, also to the member 86 and form parts of the rack 86 upon which articles to be dipped are placed.

In the operation of the device it will be understood that the article to be dipped is placed on the rack 22 and the operator grasping the handle 21 pushes the handle downward, submerging the rack 22 and carrying with it the articles placed upon the rack 22 and after the articles have been submerged in the solution contained in the tank it is withdrawn until the latch 46 engages the member 11 and holds the rack 22 out of the solution in the tank until such time as it may be desired. If it is desired to place a number of articles on the rack 22 this can be done and any number of them immersed in the solution contained in the tank. The counterweight 43 is selected with respect to the number of articles to be dipped and also their weight so that at least a part of the weight of the articles is counterbalanced by the counterweight so that it makes the device easier to operate than if the counterweight were not provided, although the counterweight is not essential to the operation of the device.

In the apparatus referred to in Figures 5, 6 and 7 the articles to be dipped are placed upon the rack 86 and the current is turned into the motor 66 which, through the action of the sprocket chain 67 revolves the eccentric member 68 and allows the rack 86 to pass downward into the tank 10. As the member 68 rotates the arm 54 rests upon the periphery of the member 68 and when it reaches the lower point the rack 84 is approximately at the bottom of the tank 10. As the operation is continued the revolving of the eccentric member 68 raises the arm 54 which in turn lifts the rack 86 to the top of the tank 10 where the articles to be dipped may be removed, the motor stopped and a new article placed thereon, or, if it is desired, the article can be removed and the device operated slowly enough so that it is not necessary to stop the operation of the device.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of my invention.

I claim:

1. In combination with a dipping tank, of a vertically extending guide member having a guide-way therein, a slidably mounted member in said guide-way, a rack secured to said slidably mounted member, a rocker arm secured to said slidably mounted member, a power operated eccentric member upon which said rocker arm rests, and means whereby the rocker arm is anchored at its rear end.

2. In combination with a dipping tank, of a plurality of vertically extending guide members having guide-ways therein, slidably mounted members in said guide-ways, a movable dipping rack secured to said slidably mounted members, means connecting the said slidably mounted members, a rocker arm secured to said connecting means, and a power operated eccentric member whereby said rocker arm is actuated.

Signed at Chicago, Illinois, this 6th day of May, 1921.

EDWARD KRAFT.